United States Patent [19]

Pepe et al.

[11] 4,163,073

[45] Jul. 31, 1979

[54] PROCESS FOR TREATING INORGANIC SILICEOUS SURFACES

[75] Inventors: Enrico J. Pepe; James G. Marsden, both of Amawalk, N.Y.

[73] Assignee: Union Carbide Corporation, New York, N.Y.

[21] Appl. No.: 925,202

[22] Filed: Jul. 17, 1978

Related U.S. Application Data

[62] Division of Ser. No. 813,074, Jul. 5, 1977, Pat. No. 4,122,074.

[51] Int. Cl.$^2$ .............................................. B05D 7/00
[52] U.S. Cl. ................................. 427/221; 156/329; 156/331; 156/332; 427/387; 427/390 A
[58] Field of Search .................. 427/387, 221, 390 A; 156/329, 331, 332

[56] References Cited

U.S. PATENT DOCUMENTS

| | | | |
|---|---|---|---|
| 2,931,739 | 4/1960 | Marzocchi et al. | 428/391 |
| 3,252,825 | 5/1966 | Marzocchi et al. | 427/220 |
| 3,658,571 | 4/1972 | Marzocchi | 428/368 |
| 3,674,724 | 7/1972 | Marzocchi | 260/3 |
| 3,728,146 | 4/1973 | Marzocchi | 260/3 |
| 3,837,892 | 9/1974 | Marzocchi | 428/369 |

*Primary Examiner*—Lucille M. Phynes
*Attorney, Agent, or Firm*—Richard J. Gallagher

[57] ABSTRACT

Polyester aminoalkylalkoxysilanes are provided by effecting the Michael addition reaction of an unsaturated conjugated polyester having a molecular weight of at least 1000 with an aminoalkylalkoxysilane. The said polyester aminoalkylalkoxysilanes have utility as adhesion promoters between inorganic siliceous materials and organic resins. When the inorganic siliceous material is glass cloth or fibers, the polyester aminoalkylalkoxysilanes have dual utility as (a) a size or protective coating for glass cloth or fibers and (b) an adhesion promoter between said glass cloth or fibers and said organic resins. Also provided are polyester aminoalkylalkoxysilanes that are formed by the linear chain-extension of an unsaturated conjugated polyester with an organic diisocyanate prior to the Michael addition of an aminoalkylalkoxysilane.

12 Claims, No Drawings

PROCESS FOR TREATING INORGANIC SILICEOUS SURFACES

This application is a division of Ser. No. 813,074, filed July 5, 1977 now U.S. Pat. No. 4,122,074.

BACKGROUND AND DESCRIPTION OF THE PRIOR ART

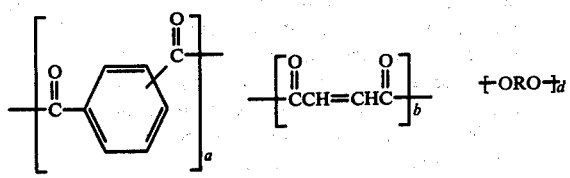

The reinforcement of resins with glass fibers is known in the art. By way of illustration, the following patents disclose the reinforcement of resinous materials with glass fibers using polyester resins and organosilicon compounds as adhesion promoters:

(1) U.S. Pat. No. 3,728,146 which discloses the reinforcement of elastomeric materials with glass fibers by a method which comprises impregnating a glass fiber bundle with an elastomer or resinous polymer and then coating the glass fiber bundle with an elastomer compatible material. Disclosure is made in the patent of polyester resin as a useful impregnating material and of organosilicon compounds as elastomer compatible materials.

(2) U.S. Pat. No. 2,931,739 which discloses the reinforcement of resinous materials with glass fibers using an organosilicon compound combined with a polyester resin as an adhesion promoter. While a saturated polyester is disclosed as a preferred embodiment in that patent, mention is made of unsaturated polyester resins (see column 4, lines 74–75; column 5, lines 1–16; and Example 8 of the patent).

(3) U.S. Pat. No. 3,252,825 which discloses a process for coating glass fibers with the hydrolyzed condensation product of amino silane and a polymer or polymer-forming material. Specific mention is made in the patent of the reaction of an unsaturated polyester with alphaaminopropyltriethoxysilane to form an aqueous size (see Example 4, column 6, of the patent). (4) U.S. Pat. No. 3,658,571 which discloses a method of reinforcing elastomeric materials with glass fibers using a composition which may contain polyester resins and which may contain an organosilicon compound.

In addition, other prior art references disclose the reaction of unsaturated polyester with halosilanes to produce silylated polyesters. For example, a publication (43 Paint Research Institute Proceedings 558, 49–53, (1974)) discloses the reaction of alkyl and aryldichlorosilanes with unsaturated polyesters to produce chlorosilane-containing polyesters. The chlorosilane-containing polyesters are then reacted with water to produce silane diols. Another publication ((Polymer Letters Edition 11, 327–332, (1973)) discloses the hydrosilation of unsaturated polyesters with dichloromethylsilane to produce silane diols.

It is desirable to produce polyester silane adhesion promoters having improved properties by the Michael addition reaction of an unsaturated conjugated polyester with an aminoalkylalkoxysilane. It is also desirable to produce a polyester silane adhesion promoter that is suitable for the reinforcement of organic resins with any inorganic siliceous material, including glass fibers and glass cloth.

SUMMARY OF THE INVENTION

The present invention relates, in part, to novel polyester aminoalkylalkoxysilane polymers having a molecular weight of at least 1000 and comprising units of the formula

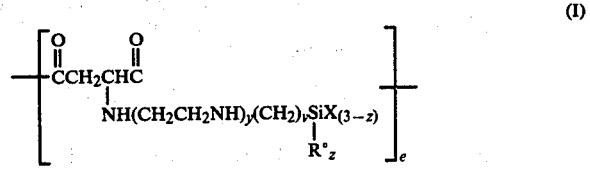

wherein R is a divalent hydrocarbon radical; R° is a monovalent alkyl, aryl or aralkyl group; X is a monovalent alkoxy, hydroxy or oxy- group; y is 0 or 1; v is an integer of 1 to 6; z is 0, 1 or 2; a is a mole fraction of 0 or 0.004 to 0.6; and b, d and e are mole fractions ranging from about 0.004 to about 0.6; with the proviso that d is greater than, equal to or slightly less than the sum of a, b and e.

Another aspect of the present invention relates to a process for preparing the polyester aminoalkylalkoxysilanes encompassed by Formula I by the Michael condensation reaction which comprises reacting an unsaturated conjugated polyester comprising units of the formula

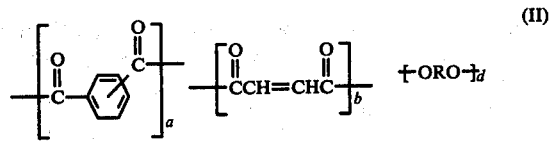

wherein R is a divalent hydrocarbon radical; a is a mole fraction of 0 or 0.004 to 0.6; and b and d are mole fractions ranging from about 0.004 to about 0.6; with an aminoalkylalkoxysilane of the formula with an aminoalkylalkoxysilane of the formula

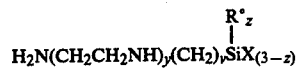

wherein R° is a monovalent alkyl, aryl or aralkyl group, X is a monovalent alkoxy group, y is 0 or 1; v is an integer of 1 to 6; and z is 0, 1 or 2; at a temperature of from about 0° C. to about 235° C. to produce the polyester aminoalkylalkoxysilane.

In accordance with a further aspect of the teachings of the present invention, a process is provided for rendering inorganic siliceous materials compatible with and adherent to organic resins comprising coating the surfaces of said inorganic siliceous material, prior to or at the time of combination with said organic resin, with a polymer comprising units of Formula I above. Thus, the novel polymers comprising units of Formula I are useful as adhesion promoters between inorganic siliceous materials and organic resins. In the instance where the inorganic siliceous material is glass fibers or cloth, the novel polymers comprising units of Formula I have dual utility as (a) a size or protective coating for the glass fibers or cloth and (b) an adhesion promoter between said fibers or cloth and said organic resins. The polymers can be applied to said glass fibers or cloth in a facile manner in the form of hydrolyzates from an aqueous solution.

In accordance with another aspect of the present invention, the polyesters of Formula II above may be chain-extended in a linear fashion by reaction with an organic diisocyanate prior to Michael addition of an aminoalkylalkoxysilane to form the corresponding polyester aminoalkylalkoxysilane. Such a method provides for silylated polymers having a very high molecular weight of greater than 5000.

DESCRIPTION OF THE PREFERRED EMBODIMENTS

The polyester aminoalkylalkoxysilanes of the instant invention may be prepared in a facile manner by the Michael condensation of an aminoalkylalkoxysilane with an unsaturated conjugated polyester. The Michael addition reaction is described in W. J. Hickinbottom, *Reactions Of Organic Compounds,* pp. 48-55 (1957), incorporated herein by reference. The Michael addition reaction for the instant invention is depicted as follows:

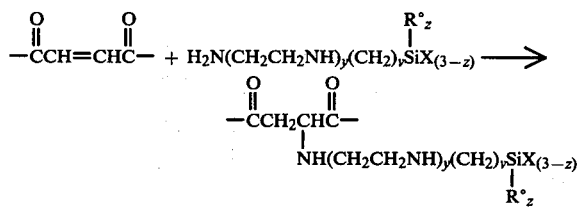

wherein R° is a monovalent alkyl, aryl or aralkyl group; X is a monovalent alkoxy, hydroxy or oxy- group; y is 0 or 1; v is an integer of 1 to 6; and z is o, 1 or 2.

The unsaturated conjugated polyesters useful in the process of this invention have a molecular weight of at least 1000 and comprise units of the formula

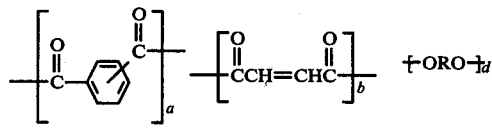

wherein R is a divalent hydrocarbon radical; a is a mole fraction of 0 or 0.004 to 0.6; and b and d are mole fractions ranging from about 0.004 to about 0.6. Typical of the polyfunctional organic carboxylic acids that can be employed in producing unsaturated polyesters useful in preparing the polymers of this invention are: dicarboxylic aliphatic acids such as maleic, chloromaleic, dichloromaleic, succinic, adipic, sebacic, azelaic, glutaric, pimelic, malonic, suberic, itaconic and citraconic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the unsaturated polyesters.

The dihydric alcohols that can be employed in producing the unsaturated polyester starting materials used in the process of this invention include glycols such as, for example, ethylene, propylene, butylene, tetramethylene, hexylene and hexamethylene glycol; and diols such as, for example, 1,2-propanediol; 1,3-propanediol; 1,4-butanediol; 2,3-butanediol; 2-butenediol; 1,5-pentanediol; 2-ethyl-1,3-hexanediol; and 1,3-butanediol.

Although the amounts of the above-described dihydric alcohol and polyfunctional organic carboxylic acid employed in the production of the unsaturated polyesters of the present invention are not narrowly critical, it is generally preferred to use from about a 10 percent to about a 20 percent molar excess of dihydric alcohol relative to the amount of carboxylic acid used. Inasmuch as the reaction of the carboxylic acid with the dihydric alcohol to produce unsaturated polyesters is seen to proceed in step-wise fashion, including: (a) formation of the mono-adduct of the ester, (b) condensation of carboxyl group with hydroxyl group to form polyester and water, and (c) transesterification of polyester chain ends to form higher molecular weight polyesters, a broad reaction temperture range is employed in the production of said polyesters. A preferred temperature range for the process of reacting polyfunctional organic carboxylic acid with dihydric alcohol to produce unsaturated polyester is from about 100° C. to about 250° C. The unsaturated polyester useful in the process of this invention may be prepared in the presence or absence of solvents such as xylene and in the presence or absence of conventional transesterification catalysts such as tetra-alkyl titanate and p-toluene sulfonic acid.

It is generally preferred that the unsaturated polyesters useful in the process of the present invention have a relatively high molecular weight of from about 2000 to about 5000. For the purpose of producing high molecular weight polyesters, polyesters containing hydroxyl or carboxyl end groups may be reacted with an organic diisocyanate, most desirably in the ratio of at least 1 mole of diisocyanate to 1 mole of polyester, to form a chain-extended polymer. Useful diisocyanates are any of the following including mixtures thereof: 1,6-hexamethylene diisocyanate; 1,4-tetramethylenediisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyldiisocyanate; durylene diisocyanate; and other organic diisocyanates known to the polyurethane art.

Typical of the aminoalkylalkoxysilanes suitable for use as starting materials in the present invention are those compounds represented by the structural formula:

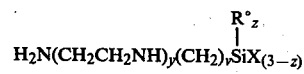

wherein R° represents an alkyl group such as the methyl, ethyl propyl and butyl groups and the like, or an aryl group such as the phenyl, naphthyl and tolyl groups and the like or an aralkyl group such as a benzyl group and the like, X represents an alkoxy group such as the methoxy, ethoxy propoxy, and 2-ethyl hexoxy groups and the like, y is 0 or 1, v is an integer of 1 to 6 and preferably 3 or 4, and z is 0, 1 or 2. Illustrative of such aminoalkylalkoxysilanes are aminomethyltriethoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta(aminoethyl)gamma-aminopropyltrimethoxysilane, delta-aminobutyltriethoxysilane, delta-aminobutylmethyldiethoxysilane, delta-aminobutylethyldiethoxysilane, delta-aminobutylphenyldiethoxysilane and the like. The preferred aminoalkylalkoxysilanes are gamma-aminopropyltriethoxysilane and N-beta(aminoethyl)gamma-aminopropyltrimethoxysilane. Branched-chain silanes (not encompassed by the above formula) such as beta-aminoisopropyltriethoxysilane are also useful in the present invention.

The inorganic siliceous materials useful in the process of the present invention include any solid or particulate silicon-containing material such as silica, glass, asbestos, glass fibers, glass cloth, wollastonite, and the like.

Useful organic resins include with thermosetting resins such as the unsaturated polyester resins described above and thermoplastic resins. Examples of useful thermoplastic resins include those derived from difunctional monomers and include polyolefins such as polyethylene, polypropylene, polystyrene, polybutylene and polyisocyanate; halogenated polyolefins such as polyvinylchloride, polyvinylidenechloride, polyvinylidenefluoride, polytetrafluoroethylene and polytrifluoropropene; substituted polyolefins such as polyvinylacetate, polyacrylonitrile, polyacrylate and polymethacrylates such as polymethylmethacrylate and polyethylmethacrylate; polyesters such as poly-1,4-butanediolisophthalates; polyamides such as those formed from adipic acid and hexamethylenediamine; polycarbonates such as the reaction products of carbonylchloride and p,p'-bishydroxyphenyldimethylmethane; cellulosic ethers and esters such as cellulose acetate and ethylcellulose; and polyacetals such as polyformaldehyde. The preferred organic resins are the thermosetting unsaturated polyester resins.

The process of the instant invention is carried out by reacting the aminoalkylalkoxysilane with the unsaturated polyester according to the Michael condensation reaction. Although the temperature for the reaction in accordance with the process of the invention is not narrowly critical, it is preferred that said reaction be carried out at from about 0° C. to about 200° C. A more preferred temperature range is from about 20° C. to about 100° C.

Room temperature is the most preferred temperature for the process of the invention. Although super- or subatmospheric pressure may be used in the process of the invention, atmospheric pressure is preferred unless low boiling solvents are used. Reaction time is generally less than 10 hours, but it may be longer if desired for some purpose.

The process of the invention can be carried out in the presence or absence of a solvent. The amount of solvent employed, if used, is not critical and the primary purpose of the solvent is to facilitate handling of the reaction mixture. If employed, the solvent can be either water soluble or water insoluble, depending upon the intended use, provided that the solvent does not react with the unsaturated polyester or the aminoalkylalkoxysilane reactants. For example, the solvent can be a hydrocarbon such as benzene, tolylene, pentane, and the like; or any halohydrocarbon such as chlorobenzene or chlorotolylene; ethers such as dibutyl ether, the methyl ether of ethylene glycol, or the dimethyl ether of ethylene glycol; or nitriles such as acetonitrile. For certain applications such as the commercial manufacture of sized glass fiber roving for reinforcement of organic resin, a water soluble solvent is preferred.

Other ingredients may also be present in the reaction mixture. For example, an organic acid such as acetic acid may be added to the reaction mixture in order to produce cationically charged aminoalkylalkoxysilane acetate groups along the polyester silane chain. Other useful organic acids include methylacetic acid, butyric acid or benzoic acid. Also, an organic tertiary amine such as, for example, triethylamine, tributylamine, or diethylbutylamine, may be added to the unsaturated polyester reactant prior to the Michael condensation reaction in order to produce carboxyl anions at terminal or pendant carboxyl sites along the polyester chain, thus ensuring that all of the aminoalkylalkoxysilane reacts at the unsaturated portion of the polyester.

EXPERIMENTAL

The following experimental description illustrates the present invention. In the experimental description, the following abbreviations are used:

| Abbreviation | Meaning |
| --- | --- |
| Polyester A | A styrene-free unsaturated polyester resin having a degree of unsaturation of 0.61 moles/kilogram. ("PARAPLEX P-43", a product of Rohm and Haas Company, after being stripped of styrene) |
| Polyester B | A styrene-free unsaturated polyester resin having a viscosity of 18.0 centistokes at 22.8° C. and a degree of unsaturation of 1.0 moles/kilogram. ("MARCO GR13021", a product of W. R. Grace & Company, after being stripped of styrene) |
| Polyester C | A styrene-free unsaturated polyester resin having a viscosity of 13.6 centistokes at 22.5° C. and a degree of unsaturation of 0.83 moles/kilogram. (STYPOL", a product of Freeman Chemical Corp.) |
| PVAC | Polyvinylacetate. |
| Catalyst I | A 50/50 weight percent mixture of benzoyl peroxide/tricresolphosphate ("LUPERCO ATC", a product of Lucidol Division of Pennwalt Corp.) |
| Silane A | N-beta(aminoethyl)gamma-aminopropyltrimethoxysilane |
| Silane B | gamma-aminopropyltriethoxysilane |
| Silane C | gamma-aminopropyltriethoxysilane |
| Silane D | gamma-methacryloxypropyltrimethoxysilane |
| Solvent I | The methyl ether of ethylene glycol |
| psi | pounds per square inch gauge |
| cstks | centistokes |
| wt. percent | weight percent |
| PA | phthalic anhydride |

| Abbreviation | Meaning |
|---|---|
| MA | maleic anhydride |
| EG | ethylene glycol |
| PG | propylene glycol |
| BD | butane diol |
| MAS | The Michael addition product of an equimolar amount of maleic anhydride and Silane B |

Procedure A: Preparation of an Intermediate Polyester having the structural formula $$[MA]_{1.0}[PG]_{1.1}$$

Into a 2 liter, 3-necked flask equipped with a mechanical stirrer, a heating mantle and a condenser with a Dean-Starke trap, were placed 423 grams (4.0 moles) of maleic anhydride ("certified" grade) and 174 grams of xylene ("laboratory" grade). The mixture was stirred, heated to 90° C., and maintained at 90° C. until the reactants were well-dispersed, and then 334 grams (4.4 moles) of 1,3-propylene glycol ("laboratory" grade) were added rapidly and the stirred solution was heated to about 140° C. At this point 61.7 grams of water and xylene were removed overhead over a period of 6 hours until a pot temperature of 150° C. was reached. Additional water and xylene were removed as the reactant mixture was heated to 190° C. and held at that temperature for one hour. The total amount of water and xylene distillate removed was 218.4 grams. After cooling the reaction mixture to 130° C., 694 grams of Solvent I and 0.27 grams (500 ppm) of phenothiazine were added while the mixture was stirred. The mixture was pressure filtered under dry nitrogen through a 1 to 2 micron filter pad to obtain 1424 grams of a clear, light amber polyester resin solution having a viscosity of 35.0 centipoise at 25° C. A weight loss determination on an aliquot of the resin solution in an aluminum dish placed in a forced draft oven for 1 hour at 120° C. showed the resin solution to have a 46.5 wt. % solids content.

Upon analysis the composite structure of the polyester resin product was determined to be:

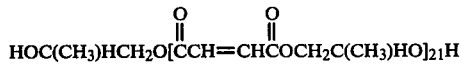

$$HOC(CH_3)HCH_2O[\overset{O}{\overset{\|}{C}}CH=CH\overset{O}{\overset{\|}{C}}OCH_2C(CH_3)HO]_{21}H$$

The product contained 5.30 milliequivalents/gram of conjugated unsaturation as compared to a calculated theoretical concentration of 5.76 milliequivalents/gram.

The other intermediate polyesters provided in Table II were produced in an analogous manner.

Procedure B: Preparation of Polyester Aminoalkylalkoxysilanes

Each of three 250 ml, 3-necked flasks (flasks #1, 2 and 3) equipped with a magnetic stirrer, a thermometer, a heating mantle and a water-cooled condenser were charged with 39.0 grams (0.1 moles) of Solvent I-diluted polyester resin prepared using Procedure (A) above. Additional Solvent I was added to flasks #1, 2 and 3 in amounts of 18.1 grams, 14.0 grams and 9.7 grams, respectively. To each flask was added 4.1 grams (0.04 moles) of triethylamine, and the mixtures were stirred and heated to about 90° C. The mixtures were then cooled to about 60° C. and 11.0 grams (0.05 moles) of Silane B was added to flask #1, 7.8 grams (0.035 moles) of Silane B was added to flask #2, and 1.2 grams (0.02 moles) of Silane B was added to flask #3. All three reaction mixtures were heated to reflux and the reaction mixtures were refluxed for about 1 hour and then cooled to room temperature. Next, glacial acetic acid was added to the flasks in amounts as follows: 3.0 grams (0.05 moles) of glacial acetic acid was added to flask #1; 2.1 grams (0.035 moles) was added to flask #2; and 1.2 grams (0.002 moles) was added to flask #3.

The polyester silane product of flask #1 had the composite structural formula $$[MA]_{0.5}[MAS]_{0.5}[PG]_{1.1}$$

A 1 wt. percent active solids solution of this product in distilled water provided a slightly hazy solution with a pH of 9.9. Addition of a small amount of acetic acid produced a clear aqueous solution.

The polyester silane product of flask #2 had the composite structural formula $$[MA]_{0.6}[MAS]_{0.4}[PG]_{1.1}$$

A 1 wt. percent active solids solution of this product in distilled water provided a hazy solution having a pH of 9.85. Adjustment of the pH to 3.5 through the addition of acetic acid produced a slightly hazy dispersion.

The polyester silane product of flask #3 had the composite structural formula $$[MA]_{0.8}[MAS]_{0.2}[PG]_{1.1}$$

A 1 wt. percent active solids solution of this product in distilled water resulted in a milky dispersion having a pH of 9.9. Adjustment of the pH to 3.5 through the addition of acetic acid produced an opaque, clarified dispersion.

The polyester silanes of Runs 2 to 16 and 20 to 39 were produced in a manner analogous to the above.

Procedure C: Laminate Composite Preparation and Testing

Aqueous 0.5 wt. percent solutions of polyester aminoalkylalkoxysilane were prepared, and swatches of glass fiber fabric (J. P. Stevens' #1581-112) were treated with these solutions. The finished glass cloth was air dried for a period of 20 minutes and then heat set for 2.5 minutes at 135° C.

A resin mixture consisting of 400 parts of Polyester A, 40 parts of styrene monomer and 4 parts of Catalyst I was poured onto a 44 inch piece of 3 mil Mylar film, and a piece of glass fabric was placed on top of the resin mixture. Alternate layers of the resin mixture and the glass cloth were then placed on top of each other until twelve layers were formed. The Mylar film was folded to make a bag around the resin-glass layers, and after the edges of the film were sealed the air bubbles were removed from the resin using a steel roller. Composites were pressed from the resin-glass layers to 0.125 inch stops for 30 minutes at 100° C.

Flexural strength tests were performed both on dry composites and on wet composites which had been subjected to an 8 hour immersion in boiling water in accordance with ASTM D790-71.

Procedure D: Linear Chain Extension Of Polyester Using Toluene Diisocyanate

Polyester B was chain-extended using Toluene Diisocyanate in the following manner: A 500 milliliter, 3-necked flask equipped with a mechanical stirrer, heating mantle, a thermometer, and a nitrogen by-pass at the outlet was charged with 82 grams (0.041 moles) of Polyester B added as a 41 wt. percent solids solution dissolved in a 61:39 weight percent ratio of xylene: ethylene glycol dimethyl ether. While stirring the mixture at room temperature, 7.1 grams (0.0407 moles) of toluene diisocyanate (TDI) was slowly added followed by one gram of triethylamine, and the mixture was brought to reflux at about 108° C. After refluxing for 1–2 hours, the viscosity of the mixture increased until a rubbery mass suddenly formed, indicating that a near limiting molecular weight has been achieved. At that point, the reaction was quenched by the rapid addition of 200 grams of ethylene glycol monomethyl ether. The mixture was heated to near reflux temperature and maintained at that temperature for a few hours while stirring until complete dissolution occurred. The polyester product was cooled to room temperature.

Procedure E: Preparation Of Pulltruded Rods

Water-sized continuous strand glass roving (Owens Corning Fiberglas' "OCF861") was wrapped 22 times around a 38 inch steel frame and cut to form 22 lengths of roving about 6 feet long. These lengths of roving were tied together at one end using a piece of 20 gauge copper wire to form a bundle.

A resin mixture consisting of 1000 parts of Polyester A, 100 parts of styrene monomer and 10 parts of Catalyst I was prepared. The roving bundle was immersed in the resin formulation for 30 minutes prior to being drawn up a precision-bore glass tube having an inner diameter of 0.25 inches. The glass tube was pre-treated with a silicon resin release agent. The drawing rate was about 3.5 inches per minute. The resulting pulltruded rods were placed in a forced air circulating oven at 100° C. and allowed to cure for 30 minutes.

Flexural strength tests were performed both on "dry" rods and on "wet" rods which had been subjected to a 24 hour immersion in boiling water in accordance with ASTM-D349-261.

Procedure F: Physical Properties Of Sized Roving (1) Abrasion Resistance Test—A bundle of glass roving (about 2000 strands/bundle) sized with the appropriate formulation and 50 inches in length was tested for abrasion resistance by (a) being twisted into a "figure 8" position in order to provide a center contact point for self-abrasion and (b) rubbing at the center contact point at a rate of 116 cycles per minute using a tension of 192 grams. Seconds to breaking of the bundle was measured.

(2) Stiffness—This test corresponds to the European stiffness test (DIN-52316). In this test, 1000 mm. lengths of glass roving were draped over a hook 10 mm. in diameter having a radius of curvature of 10 mm. Stiffness was measured in millimeters as the distance between the hanging ends of roving at a point 62 mm. below the point of support.

EXAMPLE 1

In accordance with Procedure B above, several polyester aminoalkylalkoxysilanes were prepared by the Michael addition of an aminoalkylalkoxysilane to a commercial unsaturated polyester. Tests were performed on sized roving in accordance with Procedure F above using the polyester aminoalkylalkoxysilanes as adhesion promoters. In addition, tests measuring the effectiveness of the polyester aminoalkylalkoxysilanes as sizes in pulltruded rods were performed in accordance with Procedure E. The polyester silanes were prepared as follows: Runs 2 to 5 utilize Polyester A and Silane A, Run 6 utilizes Polyester A and Silane B, Runs 7 to 12 and 14 utilize Polyester B and Silane B, Run 13 utilizes Polyester B and Silane C, and Runs 15 and 16 utilize Polyester C and Silane B. Control Run 1 uses Polyester A and no silane, control Run 17 uses an unreacted mixture of Polyester D and Silane D, control Run 18 uses Silane D and no polyester and control Run 19 uses no polyester and no silane.

The results appear in Table I which follows.

TABLE I

| | Formulation | | Moles of Reactants | | | Solvent I | Viscosity of 25 Wt % of Polyester Silane In Solvent I | Sized Roving Properties[1] | | Composite Properties[1] Flexural Strength (psi × 10 − 3) | |
|---|---|---|---|---|---|---|---|---|---|---|---|
| Run | Polyester | Silane | Polyester | Silane | Acetic Acid | (grams) | (cstks at °C.) | Abrasion Resistance (seconds) | Stiffness (mm) | (Dry) | (Wet)[8] |
| 1[2] | A | — | — | — | — | — | — | — | — | 103.9 | 51.3 |
| 2 | A | A | 1.74 | 1.3 | 10.4 | 2376 | 8.7 at 22.5° | — | — | 120.7 | 85.3 |
| 3 | A | A | 2.03 | 0.75 | 6.0 | 2640 | — | — | — | 117.9 | 81.9 |
| 4 | A | A | 2.22 | 0.40 | 3.2 | 2808 | — | — | — | 115.6 | 72.2 |
| 5 | A | A | 2.33 | 0.20 | 1.6 | 2904 | — | — | — | 126.6 | 68.1 |
| 6 | A | B | 1.74 | 1.3 | 10.4 | 2376 | — | — | — | 129.4 | 77.2 |
| 7 | B | B | 2.85 | 1.3 | 10.4 | 2376 | 9.8 at 22.0° | 236 | 47 | 128.0[4] | 99.1[4] |
| 8 | B | B | 2.85 | 1.3 | 10.4 | 2376 | 9.8 at 22.0° | 272 | 60 | 126.0[5] | 93.3[5] |
| 9 | B | B | 2.85 | 1.3 | 10.4 | 2376 | 9.8 at 22.0° | 266 | 71 | 123.0[6] | 90.5[6] |
| 10 | B | B | 2.85 | 1.3 | 10.4 | 2376 | 9.8 at 22.0° | 228 | 86 | 118.0[7] | 94.7[7] |
| 11 | B | B | 2.85 | 1.3 | 5.2 | 2688 | 9.1 at 23.8° | 254 | 47 | 125.0 | 92.9 |
| 12 | B | B | 3.12 | 1.0 | 8.0 | 2520 | 10.4 at 22.2° | 278 | 54 | 121.0 | 102.0 |
| 13 | B | C | 2.85 | 1.3 | 10.4 | 2376 | 9.9 at 23.2° | 273 | 53 | 121.0 | 98.2 |
| 14 | B | B | 2.85 | 1.3 | 5.2 | 2376 | 10.3 at 23.2° | 218 | 47 | 123.0 | 83.2 |
| 15 | C | B | 2.37 | 1.3 | 10.4 | 2376 | 6.0 at 23.0° | 237 | 59 | 122.0 | 79.7 |
| 16 | C | B | 2.62 | 1.3 | 10.4 | 2376 | 6.2 at 22.5° | 371 | 52 | 121.0 | 80.2 |
| 17[2] | — | D[3] | — | 1.3 | — | — | — | 144 | 54 | 125.0 | 91.4 |
| 18[2] | — | D | — | 1.3 | — | — | — | 50 | 35 | 135.0 | 118.0 |

TABLE I-continued

| Run | Formulation Polyester | Formulation Silane | Moles of Reactants Polyester | Moles of Reactants Silane | Moles of Reactants Acetic Acid | Solvent I (grams) | Viscosity of 25 Wt % of Polyester Silane In Solvent I (cstks at °C.) | Sized Roving Properties[1] Abrasion Resistance (seconds) | Sized Roving Properties[1] Stiffness (mm) | Composite Properties[1] Flexural Strength (psi × 10 − 3) (Dry) | Composite Properties[1] Flexural Strength (psi × 10 − 3) (Wet)[8] |
|---|---|---|---|---|---|---|---|---|---|---|---|
| 19[2] | — | — | — | — | — | — | — | 89 | 35+ | 98.8 | 52.8 |

[1]The treating solutions for the Sized Roving and Composite Tests contain 0.5 wt percent polyester silane in water unless otherwise indicated. For a description of these tests, see Procedures F and E, respectively.
[2]Control runs.
[3]This formulation comprises an unreacted mixture of Silane D and PVAC.
[4]Determined using a 0.25 wt percent treating solution of polyester silane.
[5]Determined using a 6.5 wt percent treating solution of polyester silane in water.
[6]Determined using a 1.0 wt percent treating solution of polyester silane in water.
[7]Determined using a 1.5 wt percent treating solution of polyester silane.
[8]Samples immersed in boiling water for 24 hours prior to testing.

The results as presented in Table I show that the polyester silanes of the present invention are considerably more effective both as glass sizes and as adhesion promoters than are control formulations consisting of only polyester (Run 1), a simple unreacted mixture of a polyester and a silane (Run 17), a formulation consisting of only a silane (Run 18), and a formulation using no polyester and no silane (Run 19). For example, abrasion resistance time increased from 144 seconds, 50 seconds, and 89 seconds in Runs 17, 18 and 19, respectively, to between 218 seconds (Run 14) and 371 seconds (Run 16) using the sizes of the instant invention. Thus, self-abrasion of the glass fibers in the glass roving is effectively reduced by using the sizes of the instant invention. As is noted in Table I, there was a corresponding increase in the sized glass stiffness relative to the glass containing no size (Run 19) and that containing only a silane size (Run 18).

The results as given in Table I also demonstrate the effectiveness of the polyester silanes of the present invention (Runs 2 to 16) as adhesion promoters between glass roving and Resin A in pulltruded rods. For example, the dry flexural strength of the composites prepared using the compounds of the instant invention (ranging from $115.6 \times 10^3$ psi provided by Run 4 to $129.4 \times 10^3$ psi provided by Run 6) is exceeded only by the composite prepared using Silane D as the adhesion promoter ($135.0 \times 10^3$ psi, Run 18). The results obtained using the wet flexural strength test are analogous. Thus, the polyester silanes of the instant invention are effective as adhesion promoters for glass roving-resin composites.

EXAMPLE 2

Several unsaturated polyesters were prepared according to Procedure A above, and the properties of these polyesters are given in Table II below. In accordance with Procedure B above, polyester silanes were prepared for testing using these polyesters and aminoalkylalkoxysilanes. Tests measuring the performance of these polyester silanes as adhesion promoters in resin-glass cloth laminates were performed following Procedure C. The formulations are as follows: Runs 20 to 22 use polyester silanes prepared from Polyester E and Silane B; Runs 23 and 24 use Polyester silanes prepared from Polyester F and Silane B; Run 25 uses a polyester silane prepared from Polyester G and Silane B; Runs 26 to 28 use polyester silanes prepared from Polyester H and Silane B; Run 29 uses a polyester prepared from Polyester H and Silane A; Run 30 uses a polyester silane prepared from Polyester I and Silane A; Run 31 uses a polyester silane prepared from Polyester J and Silane A; Runs 32 to 34 use polyester silanes prepared from Polyester K and Silane B; Runs 35 to 36 use polyesters prepared from Polyester L and Silane B; and Runs 37 to 39 use polyesters prepared from Polyester M and Silane B. Control Runs 40 to 42 use Polyesters E, I, and K, respectively, and no silane.

The results appear in Table III which follows.

TABLE II

Properties Of Intermediate Polyesters[1]

| Polyester | Moles Of Reactants | Process | Viscosity Of Polyester (Centipoise at 25° C.) | Extent of Unsaturation (moles/kg.) Calculated | Extent of Unsaturation (moles/kg.) Actual |
|---|---|---|---|---|---|
| E | $[PA]_{.5}[MA]_{1.5}[PG]_{2.1}$ | A[2] | 27.5 | 1.90 | 1.90 |
| F | $[PA]_{.5}[MA]_{1.5}[PG]_{2.1}$ | B[3] | 47.0 | 1.90 | 1.90 |
| G | $[PA]_{.5}[MA]_{1.5}[PG]_{2.2}$ | B[3] | 73.0 | 1.90 | 1.87 |
| H | $[PA]_{.5}[MA]_{1.5}[PG]_{2.1}$ | A[2,4] | ND[5] | 1.90 | 1.62 |
| I | $[PA]_{1.0}[MA]_{1.0}[PG]_{2.1}$ | A[2] | 23.5 | 1.35 | 1.24 |
| J | $[PA]_{1.0}[MA]_{1.0}[PG]_{2.1}$ | B[3, 4] | ND[5] | 1.35 | 1.16 |
| K | $[MA]_{1.0}[PG]_{1.1}$ | A[2] | 35.0 | 2.88 | 2.65 |
| L | $[MA]_{1.0}[PG]_{1.2}$ | B[3] | 130.0 | 2.88 | 2.54 |
| M | $[MA]_{1.1}[PG]_{1.0}$ | A[2] | ND | 3.31 | ND |

[1]Solution of 50 wt. percent polyester in Solvent I.
[2]Prepared by refluxing for six hours with 25 wt. percent xylene in the presence of 0.2 wt. percent tetra-isopropyltitanate catalyst and 500 ppm. phenothiazene inhibitor at 145° C. ± 10° C. and then refluxing for one hour at 190° C. to remove volatile components.
[3]Prepared by refluxing for from six to twelve hours with 25 wt. percent xylene in the presence of 0.2 wt. percent tetra-isopropyltitanate catalyst and 500 ppm. phenothiazene inhibitor at 150° C. ± 5° C. and then refluxing for one hour at 230° C. before vacuum stripping at 130°-190° C.
[4]No catalyst, no inhibitor.
[5]Not determined.

TABLE III

| | Formulation | | Moles of Reactants | | | | Solvent | Composite Properties[1] Flexural Strength (psi × 10−3) | | |
|---|---|---|---|---|---|---|---|---|---|---|
| Run | Polyester | Silane | Polyester | Silane | Acetic Acid | Triethylamine | (grams) | Dry | Wet[2] | Percent Retention |
| 20 | E | B | 0.087 | 0.066 | 0.066 | 0.046 | 24.2 | 78.7 | 45.6 | 57.9 |
| 21 | E | B | 0.087 | 0.025 | 0.025 | 0.046 | 11.7 | 79.9 | 44.3 | 55.4 |
| 22 | E | B | 0.087 | 0.050 | 0.046 | 18.8 | 80.1 | 53.0 | 66.2 | |
| 23 | F | B | 0.087 | 0.066 | 0.066 | 0 | 18.6 | 79.4 | 64.4 | 81.1 |
| 24 | F | B | 0.087 | 0.066 | 0.066 | 0.027 | 21.3 | 84.3 | 62.2 | 73.8 |
| 25 | G | B | 0.086 | 0.066 | 0.066 | 0 | 18.6 | 67.8 | 38.2 | 56.4 |
| 26 | H | B | 0.074 | 0.025 | 0.025 | 0 | 7.1 | ND[3] | ND[3] | ND[3] |
| 27 | H | B | 0.074 | 0.050 | 0.050 | 0 | 14.2 | 77.6 | 65.3 | 84.1 |
| 28 | H | B | 0.074 | 0.066 | 0.066 | 0 | 18.6 | 79.6 | 63.3 | 85.8 |
| 29 | I | B | 0.050 | 0.033 | 0.033 | 0.043 | 15.9 | 70.6 | 36.2 | 51.3 |
| 30 | I | A | 0.050 | 0.040 | 0.040 | 0.043 | 15.9 | 74.6 | 46.2 | 61.9 |
| 31 | J | A | 0.116 | 0.082 | 0.164 | 0 | 18.4 | 78.3 | 70.7 | 90.3 |
| 32 | K | B | 0.100 | 0.050 | 0.050 | 0.041 | 18.1 | 62.6 | 78.1 | |
| 33 | K | B | 0.100 | 0.035 | 0.035 | 0.041 | 14.0 | 82.0 | 61.5 | 75.0 |
| 34 | K | B | 0.100 | 0.020 | 0.020 | 0.041 | 9.7 | 80.8 | 59.4 | 73.5 |
| 35 | L | B | 0.100 | 0.050 | 0.050 | 0.051 | 19.1 | 67.9 | 39.1 | 57.6 |
| 36 | L | B | 0.100 | 0.050 | 0.050 | 0 | 14.1 | 69.9 | 50.8 | 72.6 |
| 37 | M | B | 0.033 | 0.013 | 0 | 0 | 38.6 | 77.9 | 63.4 | 81.4 |
| 38 | M | B | 0.033 | 0.014 | 0 | 0 | 39.5 | ND[3] | ND[3] | ND[3] |
| 39 | M | B | 0.033 | 0.016 | 0 | 0 | 40.5 | ND[3] | ND[3] | ND[3] |
| 40[4] | E | — | | | | | | 66.6 | 22.9 | 34.4 |
| 41[4] | I | — | | | | | | 64.2 | 22.1 | 34.4 |
| 42[4] | K | — | | | | | | 62.9 | 21.9 | 34.8 |

[1]The treating solutions for the Composite Tests contain 0.5 wt. percent polyester silane in water.
[2]Samples immersed in boiling water for 24 hours prior to testing.
[3]Not determined.
[4]Control runs utilizing only polyester and no silane as the adhesion promoter.

The results as given in Table III indicate that the polyester silanes of the instant invention (Runs 20 to 38) provide superior flexural strength test results on glass cloth/resin composites using both the dry and wet flexural strength tests. For example, the runs of the present invention provided dry flexural strengths ranging from $67.8 \times 10^3$ psi in Run 25 to $84.3 \times 10^3$ psi in Run 24, whereas the control runs utilizing only unreacted polyesters and no silane as adhesion promoters provided dry flexural strengths ranging from $62.9 \times 10^3$ psi in Run 42 to $66.6 \times 10^3$ psi in Run 40. Likewise, the runs of the present invention provided wet flexural strengths ranging from $36.2 \times 10^3$ psi in Run 29 to $70.7 \times 10^3$ psi in Run 31, whereas the control runs provided wet flexural strengths ranging from $21.9 \times 10^3$ in Run 42 to $22.9 \times 10^3$ in Run 40. The adhesion promoters of the present invention also showed a higher percent retention within the composites, ranging from 51.3 percent to 90.3 percent retention, when compared to the controls which showed from 34.4 percent to 34.8 percent retention.

Runs 43 and 44

In accordance with the disclosures of U.S. Pat. No. 3,252,825, an attempt was made to duplicate Example 4 of that patent. In view of the fact that no disclosure is made in the patent of the reaction conditions for preparing the polyester of Example 4, two different Runs were made in order to encompass polyesters having a relatively high and a relatively low degree of polymerization. Inasmuch as the silane disclosed in Example 4 of the patent (alpha-aminopropyltriethoxysilane) is not commercially available and is known by those skilled in the art to be highly unstable, if obtainable, gamma-aminopropyltriethoxysilane was utilized in the Runs of the instant Example. The procedures follow:

Procedure For Run 43

Into a three-necked, 2-liter flask equipped with a mechanical stirrer, thermometer, nitrogen sponge and Dean-Starke trap with a water condenser atop were charged 212.24 grams (2.0 moles) of diethylene glycol, 148.11 grams (1.0 moles) of phthalic anhydride and 98.06 (1.0 moles) of maleic anhydride. The mixture was stirred slowly while adding 0.2 wt. percent (0.9168 grams) of p-tolyene sulfonic acid catalyst. During a 3 to 4 hour period of heating to 200°-225° C. until 9.0 grams of water were collected. The reaction mixture was then cooled to room temperature and it was noted that the polyester mixture was extremely viscous. Five hundred milliliters of diethyl ether were added to the reaction mixture. The mixture was stirred for one-half hour at room temperature, and it was noted that polyester diethyl ether layer separation occurred when stirring was stopped. The mixture was heated to 70° C., and the diethyl ether was removed prior to the addition of 200 grams of gamma-aminopropyltriethoxysilane using a dropping funnel while stirring the polyester. The temperature of the mixture was maintained at 70°-80° C. for one hour. The mixture was cooled to room temperature, and it was noted that the product was very viscous. One hundred grams of acetic acid were added. The product was not soluble in water either before or after the addition of acetic acid.

Procedure For Run 44

Repeating the procedure of Run 43 using identical amounts of reactants, the reaction mixture was heated to 135° C., held overnight, and then heated to between 200° C. and 235° C. for seven hours until water collection (27 grams of H$_2$O) has stopped. The reaction mixture was then cooled to room temperature and 500 milliliters of diethyl ether was added dropwise while stirring the mixture. After one hour of stirring, there was complete layer separation between the polyester and the diethyl ether. The mixture was heated to 70° C. and the diethyl ether was distilled off prior to the addition of 200 grams of gamma-aminopropyltriethoxysilane dropwise with stirring of the mixture. After all but about 25-30 grams of gamma-aminopropyltriethoxysilane had been added, the mixture gelled making handling impossible. Addition of 100 grams of acetic acid produced no change in the gellation of the polyester.

Run 43, which utilized a polyester having a relatively low degree of polymerization, provided an attempted modified polyester that was not soluble in diethyl ether. This insolubility indicates that it would not be useful as an aqueous forming size. Run 44, which utilized a polyester having a relatively high degree of polymerization, provided a gelled polyester silane product that would also not be useful as a size.

EXAMPLE 3

In accordance with Procedure D above, Polyester D was chain extended using toluene diisocyanate. A polyester aminoalkylalkoxysilane was prepared by the Michael addition of Silane B to "extended" Polyester B using Procedure B. A test was performed on a resin-glass roving laminate according to Procedure E using the "extended" polyester silane as an adhesion promoter. In addition, a test measuring the effectiveness of the polyester aminoalkylalkoxysilane as a size for glass roving was performed in accordance with Procedure E. The results are given in Run 45 of Table IV. Control Runs 46 and 47 utilize formulations comprising the Michael addition product of Silane B with "unextended" Polyester B.

The results appear in Table IV which follows.

TABLE IV

| | Formulation | | Flexural Strength (psi × 10⁻³) | | |
|---|---|---|---|---|---|
| Run | Polyester | Silane | Dry | Wet[3] | Percent Retention |
| 45 | B[1] | B | 118[4] | 88[4] | 74.6[4] |
| 46[2] | B | B | 110[5] | 85[5] | 77.3[5] |
| 47[2] | B | B | 113[6] | 75[6] | 66.4[6] |

[1]"Extended" Polyester B prepared in accordance with Procedure D.
[2]Control runs.
[3]Samples immersed in boiling water for 24 hours prior to testing.
[4]Determined using a 1.0 wt. percent treating solution of polyester silane in water.
[5]Determined using a 0.5 wt. percent treating solution of polyester silane in water.
[6]Determined using a 1.0 wt. percent treating solution of polyester silane in water.

The results as presented in Table IV indicate that the "extended" polyester silane of Run 45 provides a composite having greater wet and dry flexural strength than that provided by the "unextended" polyester silanes of control Runs 46 and 47. These results indicate that there is a direct relationship between an increase in molecular weight of the polyester used in producing the polyester silane and an increase in effectiveness of the polyester silane as an adhesion promoter.

EXAMPLE 4

In order to determine the effectiveness of the polyester silanes of the invention as adhesion promoters between wollastonite and polyester resin, a polyester resin/wollastonite composite was prepared as follows:

Two grams of distilled water were added to 16 grams of a 25 weight percent solution of the Michael addition product of Polyester B and Silane B in Solvent I with mixing for 5 minutes. The resulting mixture was added to 400 grams of wollastonite and tumbled for 30 minutes using a jar mill to produce treated filler. The treated filler was placed into a drying tray and dried for 60 minutes at 105° C. in a forced air oven.

A resin mixture consisting of 2200 parts of Polyester A, 220 parts of styrene monomer and 22 parts of Catalyst I was prepared. Two hundred grams of the above formulation were placed in a stainless steel bowl, and the bowl was put on a Hobart mixer equipped with a dough hook. Three hundred grams of polyester silane-treated wollastonite were added to the bowl with moderate mixing, and mixing was continued for about 25 minutes until the resulting resin/filler mixture was uniform in consistency.

The resin/filler blend was molded in an 8 inch × 8 inch × ⅛ inch chrome-plated cavity mold for 30 minutes at 100° C. and 48 tons pressure using a "Mylar" release agent. The resulting composite was cooled to room temperature under pressure to prevent warping.

As a comparison, a polyester resin/wollastonite composite was prepared using the above procedure by substituting 300 grams of untreated filler for the 300 grams of treated wollastonite used above.

The polyester resin/polyester silane-treated wollastonite composite provided an initial flexural strength of 15,800 psi and a flexural strength of 9,000 psi after humid aging, whereas the polyester resin/untreated wollastonite composite provided an initial flexural strength of 13,800 psi and a flexural strength of 6,800 psi after humid aging according to ASTM-D-790-71.

What is claimed is:

1. A process for rendering inorganic siliceous material compatible with and adherent to organic resins comprising coating the surfaces of said inorganic siliceous material, prior to or at the time of combination with said organic resin, with a polymer having a molecular weight of greater than 1000 comprising units of the formula

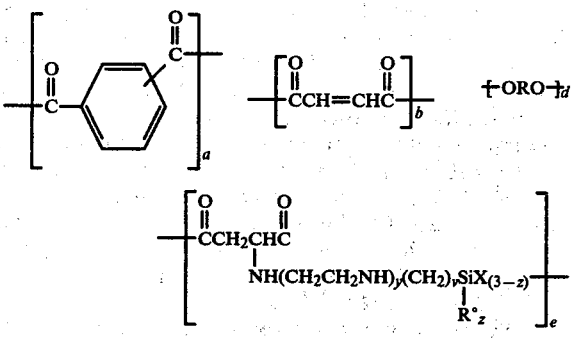

wherein R is a divalent hydrocarbon radical; R° is a monovalent alkyl, aryl or aralkyl group; X is a monovalent alkoxy, hydroxy or oxy- group; y is 0 or 1; v is an integer of 1 to 6; z is 0, 1 or 2; a is a mole fraction of 0 or 0.004 to 0.6; and b, d and e are mole fractions ranging from about 0.004 to about 0.6 with the proviso that d is greater than, equal to or slightly less than the sum of a, b and e.

2. The process of claim 1 wherein the inorganic siliceous material is glass fibers.

3. The process of claim 1 wherein the inorganic siliceous material is glass cloth.

4. The process of claim 1 wherein the inorganic siliceous material is wollastonite.

5. A process for rendering inorganic siliceous material compatible with and adherent to organic resins comprising coating the surfaces of said inorganic siliceous material, prior to or at the time of combination with said organic resin, with a polyester aminoalkylalkoxysilane prepared by the Michael addition of an unsaturated conjugated polyester having a molecular weight of at least 1000 and comprising units of the formula

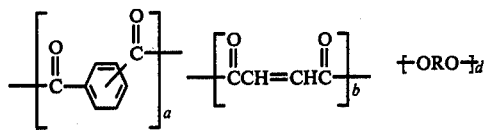

wherein R is a divalent hydrocarbon radical; a is a mole fraction of 0 or 0.004 to 0.6; and b and d are mole fractions ranging from about 0.004 to about 0.6; with an aminoalkylalkoxysilane of the formula

wherein R° is a monovalent alkyl, aryl or aralkyl group; X is a monovalent alkoxy group; y is 0 or 1; v is an integer of 1 to 6; and z is 0, 1 or 2; at a temperature of from about 0° C. to about 235° C.

6. The process of claim 5 wherein the inorganic siliceous material is glass fibers.

7. The process of claim 5 wherein the inorganic siliceous material is glass cloth.

8. The process of claim 5 wherein the inorganic siliceous material is wollastonite.

9. The process of claim 5 wherein the molecular weight of the unsaturated conjugated polyester is at least 2000.

10. The process of claim 5 wherein the molecular weight of the unsaturated conjugated polyester is at least 4000.

11. The process of claim 5 wherein the aminoalkylalkoxysilane is gamma-aminopropyltriethoxysilane.

12. The process of claim 5 wherein the aminoalkylalkoxysilane is N-beta(aminoethyl)gamma-aminopropyltrimethoxysilane.

* * * * *

UNITED STATES PATENT AND TRADEMARK OFFICE
CERTIFICATE OF CORRECTION

PATENT NO. : 4,163,073

DATED : July 31, 1979

INVENTOR(S) : Pepe et al.

It is certified that error appears in the above-identified patent and that said Letters Patent are hereby corrected as shown below:

In Table III (patent column 14), in the row numbered "22": in Table column "Acetic Acid", for "0.046" read -- 0.050 --; in Table column "Triethylamine", for "18.8" read -- 0.046 --; in Table column "grams" for "80.1" read -- 18.1 --; in Table column "Dry", for "53.0" read -- 80.1 --; in Table column "Wet$^2$"; for "66.2" read -- 53.0 --; and in Table column "Percent Retention", for "     " read -- 66.2 --.

In Table III (patent column 14), in the row numbered "32": in Table column "Dry, for "62.6" read -- 80.1 --; in Table column "Wet$^2$", for "78.1" read -- 62.6 --; and in Table column "Percent Retention" for "     " read -- 78.1 --.

UNITED STATES PATENT AND TRADEMARK OFFICE
CERTIFICATE OF CORRECTION

PATENT NO. : 4,163,073
DATED : July 31, 1979
INVENTOR(S) : Pepe et al.

It is certified that error appears in the above-identified patent and that said Letters Patent are hereby corrected as shown below:

In claim 1, in the bottom formula, near and through its right bracket, for the portion which reads

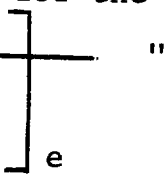  please read

Signed and Sealed this

*Thirtieth* Day of *October 1979*

[SEAL]

Attest:

RUTH C. MASON
*Attesting Officer*

LUTRELLE F. PARKER
*Acting Commissioner of Patents and Trademarks*